Oct. 6, 1936.    H. W. ALDEN    2,056,881
DIFFERENTIAL AXLE
Filed Oct. 31, 1934    2 Sheets-Sheet 1

Inventor
Herbert W. Alden
By Strauch & Hoffman
Attorneys

Oct. 6, 1936.   H. W. ALDEN   2,056,881
DIFFERENTIAL AXLE
Filed Oct. 31, 1934   2 Sheets-Sheet 2
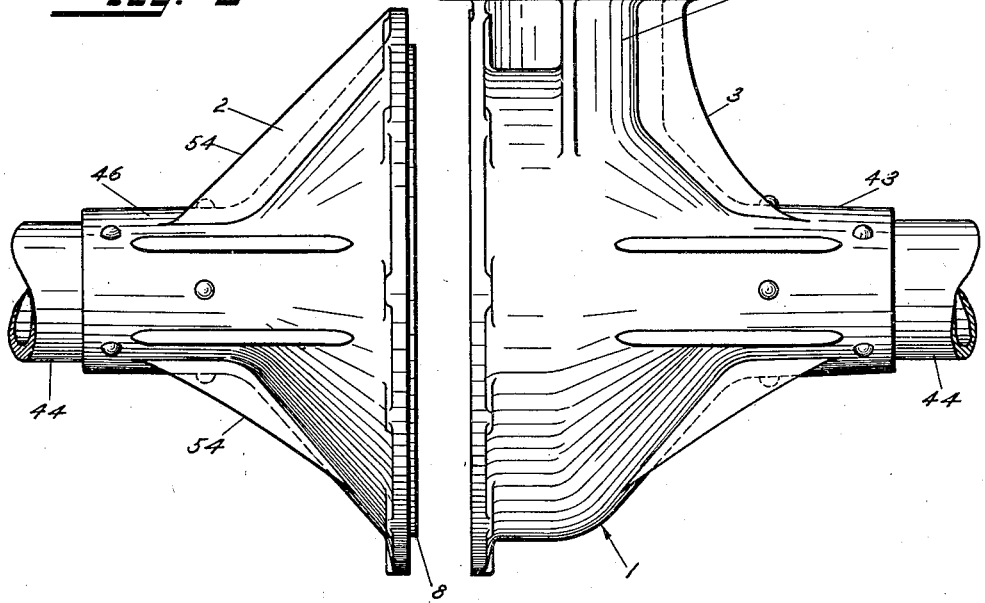
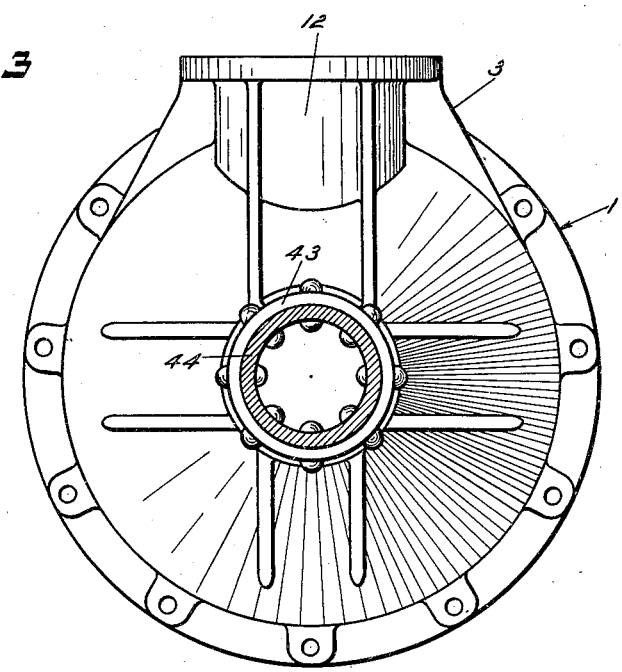
Inventor
Herbert W. Alden
By Strauch & Hoffman
Attorneys Patented Oct. 6, 1936

2,056,881

UNITED STATES PATENT OFFICE 2,056,881

DIFFERENTIAL AXLE

Herbert W. Alden, Detroit, Mich., assignor to The Timken-Detroit Axle Company, Detroit, Mich., a corporation of Ohio Application October 31, 1934, Serial No. 750,877

2 Claims. (Cl. 74—311)

This invention relates to improved differential axle constructions for medium and heavy duty service in motor buses, trucks and similar vehicles, the improved structure serving to minimize driving stresses and to secure better load distribution of the driving forces.

In previous axle constructions of the type with which this invention is concerned employing a two part differential housing, the arrangement of parts has been such as to cause undesired concentration of stresses in parts of the structure which transmit the driving force to the road wheels. Also, in previous constructions which the present invention aims to improve in ways to be pointed out in greater detail hereinafter, the bearings for supporting the differential within the differential housing portion of the axle were spaced at unequal distances on each side of the pitch surface or the plane of bevel gear tooth contact with the bevel pinion on the vehicle drive shaft. In these prior constructions, the thrust at the rim of the bevel gear produced undesirable stresses in the housing and the structure which supports the differential gears and the wheel driving axles.

The novel arrangement and combination of parts comprising the differential axle of the present invention overcomes these difficulties present in older constructions and provides for interchangeability of the wheel driving axle shafts so that full advantage may be taken of the feature of removably connecting each axle shaft to its corresponding differential gear.

The primary object of this invention is to provide a differential axle in which stresses are minimized and the structure is strengthened by a novel disposition and arrangement of parts.

A further object of the present invention is to provide for spacing the bearings which rotatably carry the differential mechanism on the differential housing of an axle, at equal distances from the radial plane passing through the intermeshing teeth of the differential driving gear and the bevel pinion on the main drive shaft.

A still further object of the present invention is to provide novel means for transmitting the side thrust imposed on the main bevel gear in a differential drive axle to the bearings for the differential mechanism without producing undesired stresses in the axle housing or increased friction in the bearings and without producing undesired bending stresses in the gear and the differential mechanism casing.

Another object of the present invention is to provide a novel differential drive axle having a centrally located propeller shaft connection and axle shafts removably connected to the side gears of the differential mechanism which is supported in the axle housing by bearings spaced at substantially equal distances from the center of the driving gear for said differential mechanism.

Still another object of the present invention is to provide a laterally extended bearing mounting means of novel construction for a differential mechanism apertured to receive a removable wheel driving axle shaft.

A still further object of the present invention is to provide in a differential drive axle, a novel two part gear driven differential housing, one part of the housing being conical in shape at one end to provide a bearing support for the housing remote from the differential gears within said housing and the other part of the housing having a bearing support in the form of a hub which also serves as a bearing for one of the differential gears.

A still further object of the present invention is to provide novel bearing mountings in the stationary housing of a drive axle for the differential mechanism, said bearings being so disposed with respect to the radial plane through the center of tooth pressure of the gear driving the differential mechanism that one part of the axle housing may be in the shape of a strongly braced steep sided cone and the bearing supporting wall of the other part may be closely adjacent the differential mechanism.

Further objects of the invention will appear in the following disclosure of preferred forms of my invention and from the appended claims:

Referring to the drawings in which like reference characters designate like parts:

Figure 2 is a view in elevation of the two members comprising the axle housing separated from each other.

Figure 3 is a view mainly in elevation of the larger axle housing member.

Figure 1:
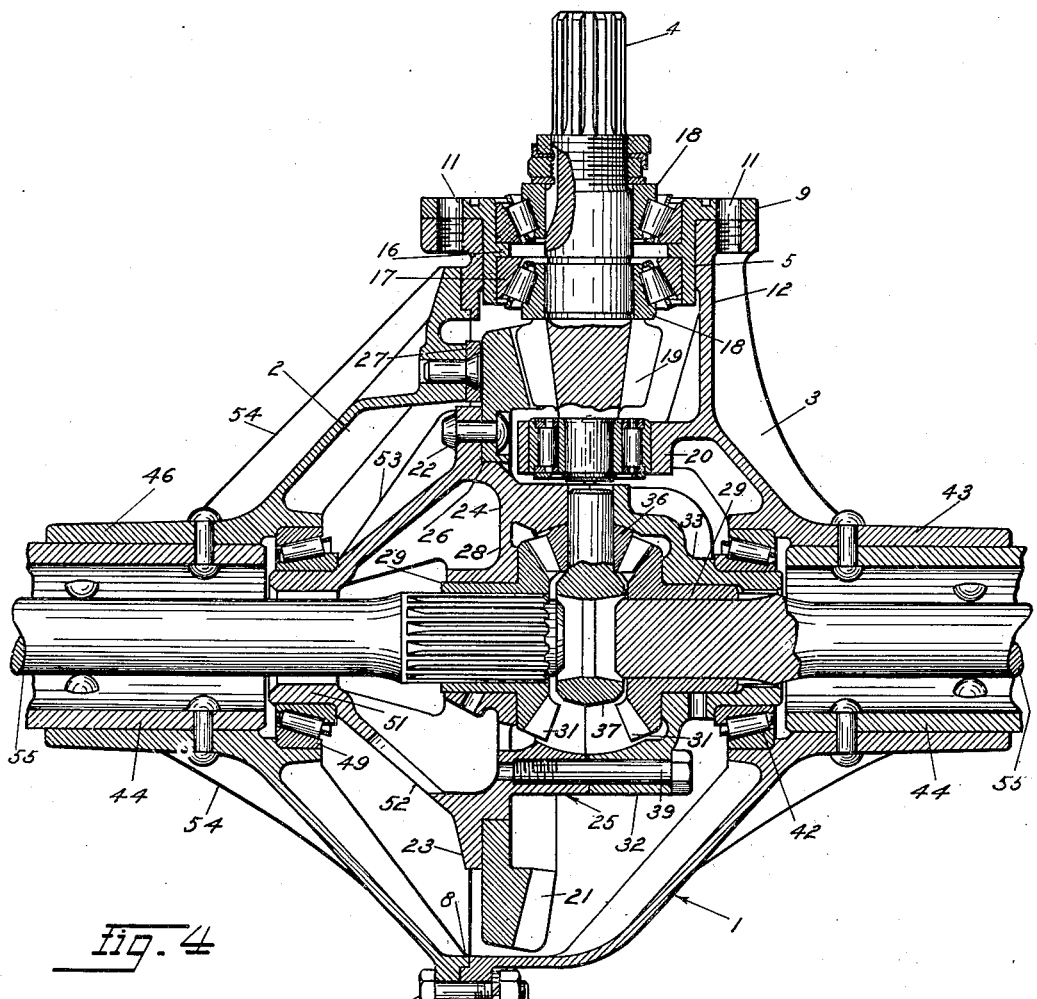
Figure 1 represents a section taken axially on a substantially horizontal plane through a drive axle embodying the present invention.
Figure 4:
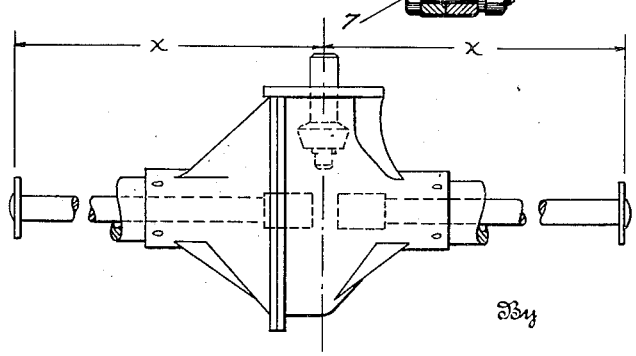
Figure 4 is a view in elevation of the locational relationship between the propeller shaft section and the axle shafts.

In the drive axle selected for the purpose of illustrating a specific embodiment of my invention, the principal stationary part thereof comprises an enlarged differential housing I made up of separable sections 2 and 3. The plane dividing these housing sections is located to one side of the main vehicle driving shaft or propeller shaft section 4 to permit the carrier 5 of said shaft to be mounted on the main or larger section 3. The sections 3 and 4 are secured together by means of bolts or other suitable fastening means 7 and an annular interfitting shoulder and recess 8 insures alignment of the housing sections 2 and 3.

The carrier for the propeller shaft section 4 is of generally cylindrical form and is provided with a circumferential flange 9 perforated to receive cap screws threaded into circumferentially spaced tapped holes 11 in the flange formed at the end of the hollow extension 12 provided on the housing member 3. The end of the extension 12 projects laterally beyond the margin of the axle housing 2. By the arrangement just described, the propeller shaft carrier is mounted wholly on the member 3 of the differential housing.

On the inside of the propeller shaft carrier is an annular rib 16 each side face of which forms a shoulder or abutment for the large end of a cup 17 of a tapered roller bearing seated therein, the cones 18 of the respective bearings being mounted on the shaft section 4. The inner end of the shaft section 4 extends beyond the driving pinion 19 and is provided with a cylindrical roller bearing, the inner raceway member of which is mounted on the end portion of said shaft and the outer raceway member of which is seated in a recess provided therefor in a lug or projection 20 from the inner face of the extension 12. The cylindrical bearing furnishes support for the inner end of the shaft and permits axial adjustments of the shaft and pinion 19.

The bevel ring gear 21 driven by the pinion 19 is secured as by rivets 22 on a flange 23 formed on the part 24 of the two part frame or casing 25 for the differential mechanism. The bevel ring gear is maintained concentric with the frame or housing 25 by an annular surface 26 formed on the frame part 24 adjacent the flange 23, and the said gear faces inwardly of the housing 3 thus affording the space for the bearing in the lateral extension 20. A thrust block 27 is positioned in the housing part 2 adjacent the outer face of the gear 21 and serves to receive abnormal stresses imposed on the adjacent portion of the ring gear. In normal operation a slight clearance exists between the thrust block 27 and the adjacent face of the ring gear to prevent undue friction therebetween.

A wall 28 closely adjacent the flange 23 is formed to provide a bearing for the splined hub 29 of one of the two opposed-bevel gears 31 of the differential mechanism. The mating part 32 which is joined to the part 24 to complete the frame 25 comprises an integral hub portion 33 for the splined hub 29 of the other bevel gear 31. Between and cooperating with the side gears 31 are a series of bevel pinions 36 each rotatably mounted on an arm of a spider 37 which is mounted concentric with the said bevel gears in or on the frame 25. Radial grooves are formed in the meeting faces of the sections 24 and 32 of the frame 25 to receive the arms of the spider which are clamped in position by the cap screws 39 that hold the frame sections together.

The hub 33 of the differential frame 25 is extended axially and is reduced in external diameter to provide a seat for the inner race of the bearing 42 by which the said frame is journaled at one end in the hub portion 43 of the housing section 3. The hub portion 43 is secured to or is integral with a tubular extension 44 upon which the vehicle body frame or chassis is spring supported. A like extension 44 is secured to the hub portion 46 of the section 2 of the housing. The end of the differential frame opposite the bearing 42 is journaled in the hub portion 46 by means of a bearing 49 the inner race of which is received on a sleeve 51 formed at the end of a conical extension 52. This conical extension is integrally joined to the frame part 24 closely adjacent to the flange 23 which carries the ring gear 22 in the preferred construction. The ribs 53 add strength to the structure of the frame 25 and enable it to withstand the thrust of the pinion 19 on the ring gear 21.

The housing section 2 surrounds the conical portion of the differential frame and is itself conical in form and is strongly braced by ribs 54. Resistance to stress is increased by the small angle between the hub portion 46 and the conical body of the housing.

It will be noted that the bearings 42 and 49 for the differential mechanism are spaced at substantially equal distances from either side of the radial plane passing through the cooperating teeth of the ring gear 21 and the bevel pinion 19. By so locating these bearings in the structure described, the effect of the thrust of the pinion 19 on the ring gear 21 is minimized so that there is little or no reaction communicated to the gears 31, and the wheel driving axle shafts 55 for this reason need not be integral with the differential gears 31. The right hand gear 31 is relatively close to the supporting bearing 49 and the conical member previously described effectively takes up the lateral thrust of the pinion on the ring gear. The bearing arrangement of this invention also eliminates possible binding of the parts and development of undesirable torques.

The axle shafts 55 are housed by the tubular extensions 44 and the splined inner ends of the shafts are received in the splined hubs 29 of the bevel gears of the differential mechanism. The splined end of the axle shaft at the left as viewed in Figure 1 projects through the sleeve 51 of the conical supporting member to cooperate with the splined hub of the gear 31 in the frame part 24. The splined inner end of the other axle shaft projects through the hub 33 to cooperate with the splined hub of the gear in the frame part 32.

It will be noted that in the structure described, the propeller shaft 4 may be located along the axial center of the vehicle while at the same time, the axle shafts 55 are of equal length and the bearings 42 and 49 are spaced equally on either side of the plane passing through the center of the cooperating teeth on the main gear and pinion. By reason of the splined connection of the shafts to their respective differential gears, these shafts may be readily removed and therefore the present invention provides a full floating type of axle construction with all of its attending advantages including ease of assembly and disassembly. By having the shafts of equal length, they are interchangeable.

From the foregoing description, the manner of operation of the axle of my invention will be readily understood. It will be seen that an axle construction of the differential type is provided that is simple in construction and is capable of resisting the shocks and stresses encountered in heavy duty service. The principles involved in my invention facilitate assembly and disassembly of the parts and reduce stresses in parts which in older constructions are inherently weak.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A differential drive axle comprising a two-part load supporting axle housing, said housing parts being joined in a plane transverse to the longitudinal axis of the drive axle, one of said housing parts having a forwardly projecting extension and an axial hub integral therewith, the other of said housing parts being cone-shaped and formed to provide a hub, hollow stationary extensions joined to said hubs, a propeller shaft provided with a bevel drive pinion mounted in said forwardly projecting extension, axle shaft sections in said hollow extensions, a differential mechanism in said housing comprising gears each having a splined connection with one of said axle shaft sections, a rotatable casing for said differential mechanism having a hub formed at one end thereof for supporting one of said gears, a wall and an internal hub carried by said wall for supporting the other of said gears and a conical extension beyond said wall on the opposite end of said casing providing a bearing sleeve remote from said last named gear supporting hub, a gear mounted on said differential casing for cooperation with said bevel drive pinion, a bearing for said differential casing in the hub of each of said housing parts, said bearings being located at substantially equal distances from a plane passing through the intermeshing teeth of said bevel pinion and gear, said first mentioned hub and said sleeve on said differential casing being journaled in said bearings, and the inner ends of said axle shafts being symmetrically disposed with reference to said propeller shaft, one of said shafts passing through said bearing sleeve to said gear mounted on said internal hub.

2. In a differential drive axle, an axle housing, a transversely disposed propeller shaft journalled in said housing at equal distances from the ends of said axle and provided with a driving pinion, a rotatable differential casing having a driving gear thereon in mesh with said pinion, a hub at one end of said casing journalled in a bearing in said axle housing, a transverse wall in said casing substantially in the plane of said gear, a hub carried by said wall in axial alignment with said first named hub, differential gears journalled in said hubs, a hollow conical extension on said casing at the end opposite said first-named hub, a sleeve formed on said conical extension and journalled in a second bearing in said housing, said bearings being located at equal distances from a plane passing through the intermeshing teeth of said pinion and bevel gear, and interchangeable axle shafts of substantially equal length extending into said casing and carried at one end by said gears.

HERBERT W. ALDEN.